US006823441B1

(12) United States Patent
Ward et al.

(10) Patent No.: US 6,823,441 B1
(45) Date of Patent: Nov. 23, 2004

(54) METHOD OF MULTIPLEXED ADDRESS AND DATA BUS

(75) Inventors: Alan R Ward, Troy, MI (US); Haitao Lin, Novi, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 665 days.

(21) Appl. No.: 09/838,975

(22) Filed: Apr. 20, 2001

(51) Int. Cl.[7] .............................................. G06F 12/00
(52) U.S. Cl. .................. 711/211; 711/153; 365/189.02; 365/230.02
(58) Field of Search ................................ 709/213, 208, 709/245; 711/153, 213, 211; 710/21, 100, 110, 124, 300–310; 340/825.5, 825.1; 370/447; 365/189.01, 189.02, 230.02

(56) References Cited

U.S. PATENT DOCUMENTS

| 4,706,082 A | 11/1987 | Miesterfeld et al. ..... 340/825.5 |
| 4,719,458 A | 1/1988 | Miesterfeld et al. ..... 340/825.5 |
| 4,739,324 A | 4/1988 | Miesterfeld et al. ..... 340/825.5 |
| 4,742,349 A | 5/1988 | Miesterfeld et al. ........ 370/447 |
| 5,086,407 A | 2/1992 | McGarity et al. ............. 710/21 |
| 5,245,705 A | 9/1993 | Swaney ...................... 709/245 |
| 5,448,703 A | 9/1995 | Amini et al. ................ 710/110 |
| 5,450,355 A * | 9/1995 | Hush ...................... 365/189.04 |
| 5,483,660 A | 1/1996 | Yishay et al. ................ 710/100 |
| 5,490,253 A | 2/1996 | Laha et al. .................. 710/124 |
| 5,550,804 A | 8/1996 | Haussler et al. ....... 340/825.01 |
| 5,611,053 A | 3/1997 | Wu et al. .................... 710/100 |
| 5,649,125 A | 7/1997 | Tietjen et al. ............... 710/305 |
| 5,729,762 A | 3/1998 | Kardach et al. .............. 710/22 |
| 5,761,443 A | 6/1998 | Kranich ....................... 710/100 |
| 5,898,848 A | 4/1999 | Gulick ........................ 710/310 |
| 5,951,659 A | 9/1999 | McElroy et al. ............ 710/300 |
| 5,960,466 A | 9/1999 | Belgard ....................... 711/213 |
| 6,032,178 A | 2/2000 | Bacigalupo et al. ........ 709/208 |
| 6,098,136 A | 8/2000 | Okazawa et al. ........... 710/306 |
| 6,233,659 B1 * | 5/2001 | Cohen et al. ............... 711/153 |

* cited by examiner

Primary Examiner—Nasser Moazzami
(74) Attorney, Agent, or Firm—Edwin W. Bacon, Jr.

(57) ABSTRACT

A multiplexed addressed data bus are provided for transferring data between two microprocessors. The multiplexed address and data bus include a plurality of multiplexed lines for communicating between the two microprocessors. A read/write signal line is also provided for communicating between the two microprocessors for indicating whether a read or a write operation is to be preformed. A chip select line is provided for transitioning to an enable condition during a data transfer cycle. A data strobe line is in communication between the two microprocessors and provides a strobe signal for each sequence of a data transfer cycle.

2 Claims, 3 Drawing Sheets

METHOD OF MULTIPLEXED ADDRESS AND DATA BUS

BACKGROUND OF THE INVENTION

1. Technical Field

The present invention relates generally to a communication architecture for communication between two microprocessors. More particularly, the invention relates to an address/data parallel bus architecture which allows communication between two system on chip (SOC) microprocessors.

2. Discussion

Current production vehicles have a variety of systems which are now controlled by microprocessors. For example, the operation of the vehicle engine is typically controlled by one microprocessor, and the operation of the vehicle transmission is typically controlled by another microprocessor. In some types of vehicles, yet another microprocessor may be used for controlling vehicle systems such as security, navigation, and safety systems such as anti-lock brakes and crash management devices. As the vehicle systems become more complex, it is necessary for the various microprocessors to share commonly used information.

System-on-chip (SOC) microcontroller architecture demands that most functions of an electronic control unit (ECU) be integrated onto one piece of silicon. The result is a SOC ECU digital core that ends up being a very large, complex piece of silicon. These SOC devices also have multi-faceted operational requirements, and thus are usually challenged by a multitude of simultaneous tasks. When adding functionality to these complex ECU's, simplicity of interface to the software is of prime importance.

When multiple ECU digital cores are housed on one physical box, often large amounts of data sharing between the ECU's must be accomplished. Each ECU has its own set of input and output functional requirements to perform its overall tasks. With present requirements these input and output functions translate into a large number of pins on the side of the silicon die as well as a large amount of processing power to handle these inputs and outputs. Sharing of some input/output functions between the digital cores housed in a single box becomes the economical choice to keep pin counts low and to keep processor burden low.

For example, two very large SOC ECU silicon digital cores could be an engine control function and a transmission control function. For optimal performance these two cores must share large amounts of data, and they must do the data sharing in real-time. The delays that are typical of a serial communication link between the ECUs may prohibit certain types of feature development, due to the delays and complexities that are inherent in serial communication links. For quick reliable communications between the two cores, a parallel bus architecture between the cores (which could place data to be communicated between the cores in specific registers for both sides to use) has been discovered to be the most efficient way to accomplish the task.

Accordingly, it is desirable to provide an address/data bus for communicating between two vehicle based microprocessors. It is further desirable to provide an address/data bus with minimized pin count which reduces the effects of electromagnetic interference (EMI). Finally, it is desirable to provide an address/data bus which allows for bus access between microprocessor cores which are running at different system clock speeds.

These and other objects are obtained by providing a multiplexed address and data bus controlled by a bus master for communication between two microprocessors. The multiplexed address and data bus include a plurality of multiplexed address and data lines in communication between the two microprocessors. A read/write control signal line is provided in communication between the two microprocessors for communicating whether a read or a write operation is to be performed. A chip select line is in communication between the two microprocessors, the chip select line transitioning to an enable condition during a data transfer cycle. A data strobe line communicates between the two microprocessors, the data strobe line providing a plurality of signals for each data transfer cycle wherein each data transfer cycle includes a plurality of write and read sequences which are initiated by the signals from the data strobe line.

BRIEF DESCRIPTION OF THE DRAWINGS

Additional objects, advantages and features of the present invention will become apparent from the following description and appended claims, taken in conjunction with the accompanying drawings in which:

DETAILED DESCRIPTION OF THE PREFERRED EMBODIMENT

Figure 1:
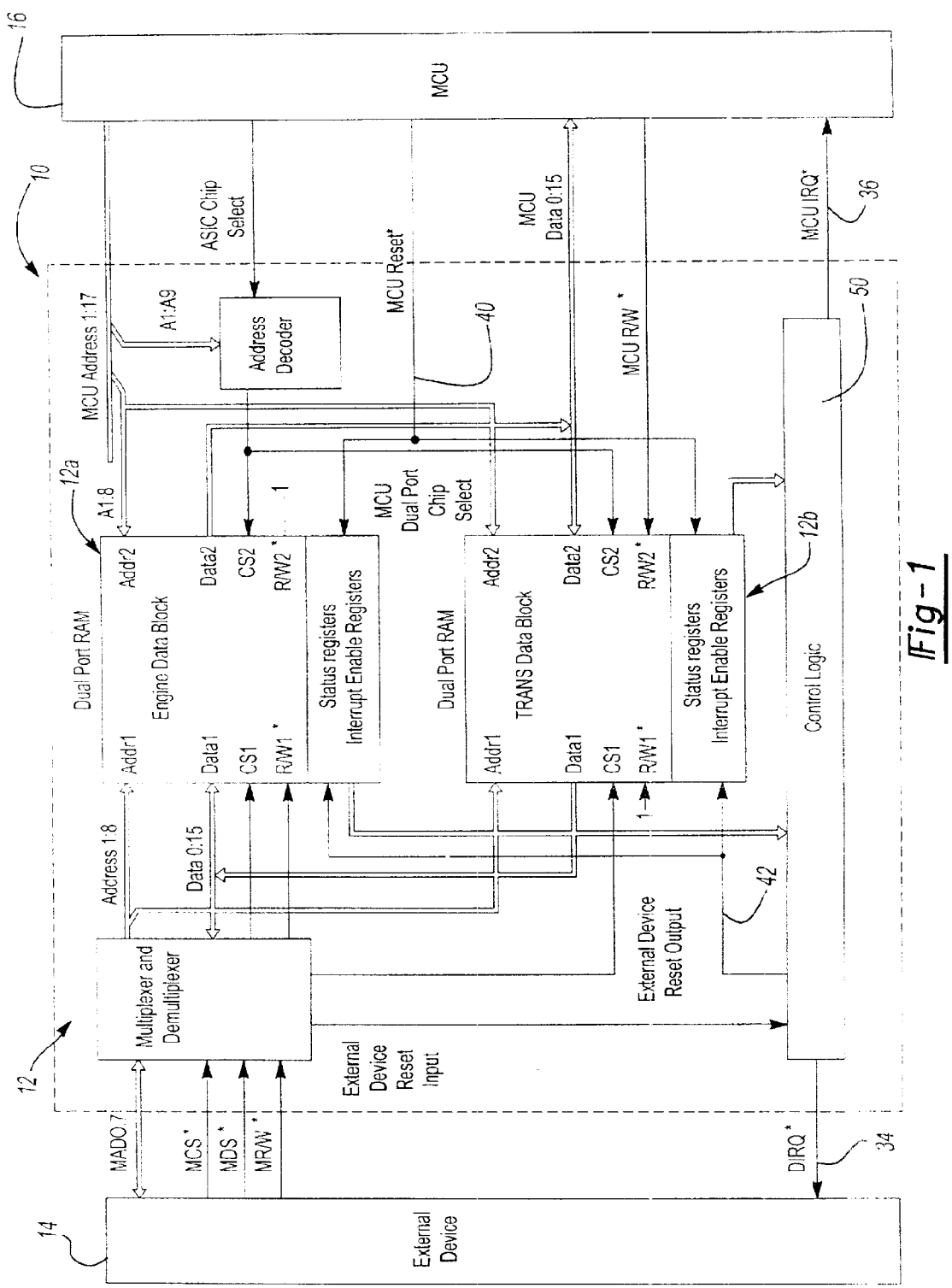
FIG. 1 is a schematic diagram showing the data bus architecture for communicating between two different microprocessors in accordance with a preferred embodiment of the present invention.
Figure 2:
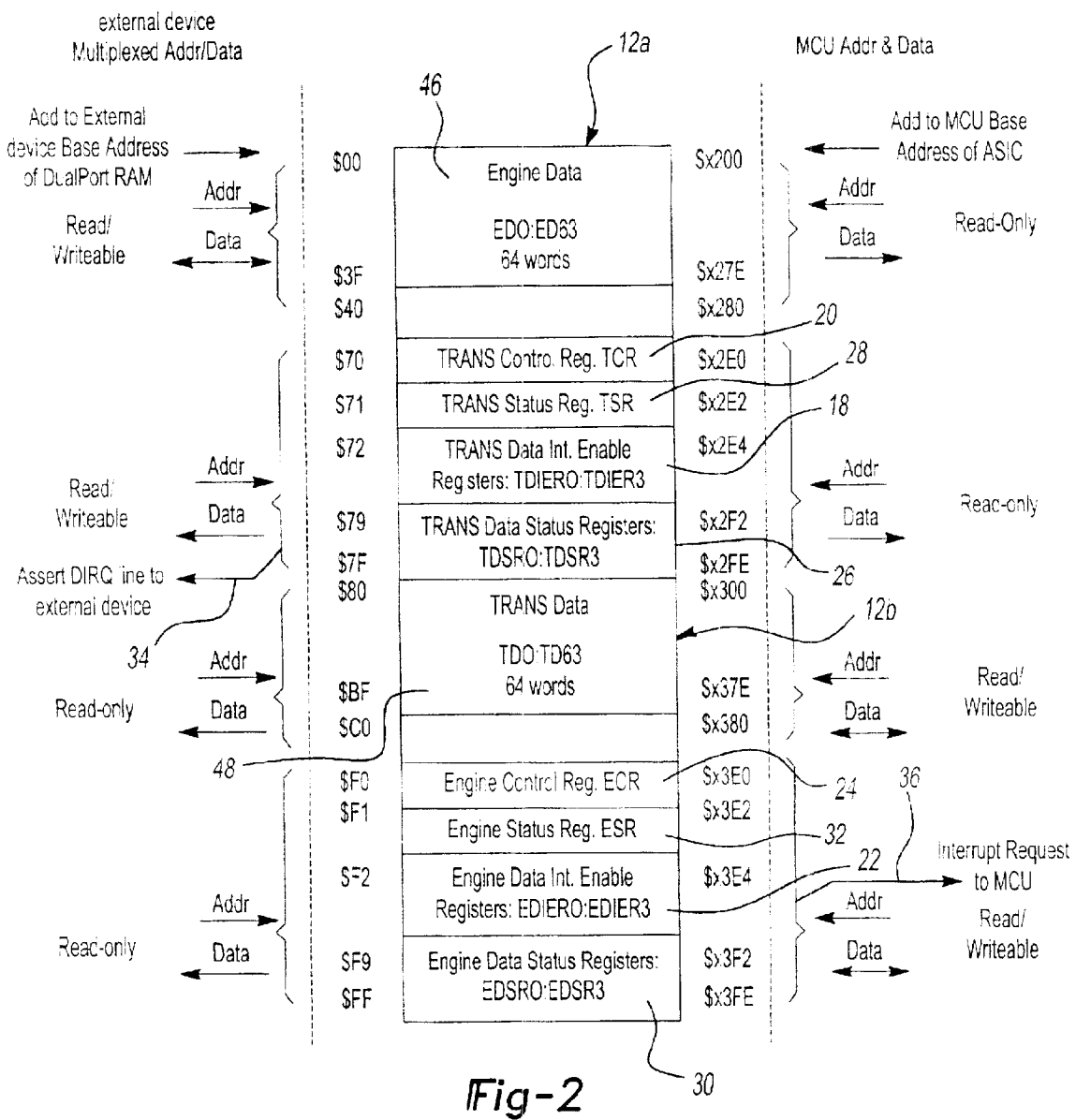
FIG. 2 is a block diagram of the dual port RAM address space according to the principles of the present invention.

Referring now to FIG. 1, the bus architecture for a dual port RAM system 10 of the present invention is shown. More particularly, the bus architecture 10 includes a dual port ram 12 which includes a 128-word array of dual port ram, which is divided into two separate 64-word addressable blocks 12A, 12B. The engine data block 12A is read/writable by an engine control unit 14 and read-only by the transmission control unit 16. The transmission data block 12B is read-only by the engine control unit 14 and read/writable by the transmission control unit 16 as illustrated in FIG. 2. As most clearly seen in FIG. 2, the dual port ram 10 includes control registers of which the engine data block 12A includes transmission data interrupt enable registers 18 (TDIER0:TDIER3) which are read/writable by the engine control unit 14 and read-only by the transmission control unit 16. The engine data block 12A also includes a transmission control register 20 (TCR) which is read/writable by the engine control unit 14 and read-only by the transmission control unit 16. The transmission data block 12B includes engine data interrupt enable registers 22 (EDIER0:EDIER3), which are read-writable by the transmission control unit 16 and read-only by the engine control unit 14. The transmission data block 12B also includes an engine control register 24 (ECR) which is read/writable by the transmission control unit 16 and read-only by the engine control unit 14.

The dual port ram 12 also includes a plurality of status registers. Specifically, the engine data block 12A includes transmission data status registers 26 (TDSR0:TDSR3) which are read/writable by the engine control unit 14 and read-only by the transmission control unit 16. The engine data block 12A also includes a transmission status register 28 (TSR) which is read/writable by the engine control unit 14 and read-only by the transmission control unit 16. The transmission data block includes engine data status registers 30 (EDSR0:EDSR3) which are read/writable by the transmission control unit 16 and read-only by the engine control unit 14. The transmission data block 12B also includes an engine status register 32 (ESR) which is read/writable by the transmission control unit 16 and read-only by the engine control unit 14.

The dual port ram 12 has a capability of generating an interrupt request to the engine control unit 14 and the transmission control unit 16. The device interrupt request line 34 may signal the engine control unit 14 upon one or more writes to the dual port ram 12B from the transmission control unit 16 or when a transmission control unit reset has occurred. The engine control unit interrupt request line 34 may be used by the engine control unit 14 as an interrupt request line or a flag at an input pin. The interrupt request is optional and is controlled by interrupt enable registers 18 (TDIER0:TDIER3).

The dual port ram 12 can also signal the transmission control unit 16 via the transmission control unit interrupt request line 36 upon one or more writes to the dual port ram 12A from the engine control unit 14 or when an engine control unit reset has occurred. The interrupt request is optional, controlled by the interrupt enable registers 22 (EDIER0:EDIER3).

The transmission control unit reset 40 (FIG. 1) will clear the engine data status registers 30 (EDSR0:EDSR3), engine data interrupt enable registers 22 (EDIER0:EDIER3) and engine control register 24 (ECR). In addition, the transmission control unit reset 40 will set the transmission reset bit in the transmission status register 28 (TSR) to inform the engine control unit 14 of the reset from the transmission control unit 16. The transmission reset bit will be held logic one for the duration of the transmission control unit reset and will stay logic one after transmission reset until cleared by the engine control unit. The engine control unit reset 42 will clear the transmission data status registers 26 (TDSR0:TDSR3), the transmission data interrupt enable register 18 (TDIER0:TDIER3) and the transmission control register 20 (TCR). Furthermore, the engine control unit reset 42 will set the engine control unit reset bit in the engine status register 32 (ESR) to inform the transmission control unit 16 of the reset from the engine control unit 14. The engine control unit reset bit will be held logic one for the duration of the engine control unit reset and stay logic one after engine reset until cleared by the transmission control unit 16.

The engine data registers 46 (ED0:ED63) are 64 word-wide RAM registers. These ram registers 46 are read/writable by the engine control unit 14 and read-only by the transmission control unit 16. The engine data registers 46 (ED0:ED63) are fill dual port ram with no component level hardware or software arbitration logic required to access these memory locations. The transmission data registers 48 (TD0:TD63) are similarly 64 word-wide ram registers. These ram registers 48 are read/writable by the transmission control unit 16 and read-only by the engine control unit 14. They are full dual port ram with no component level hardware or software arbitration logic required to access these memory locations.

The transmission data status registers 26 (TDSR0:TDSR3) are 4 16-bit transmission data status registers. These registers 26 are readable by the engine control unit 14 and the transmission control unit 16 and only writes of a logic 1 by the engine control unit 14 have an effect on the registers. The bits within the transmission data status registers are set by occurrences of write operations to the transmission data registers 48 (TD0:TD63) respectively from the transmission control unit 16. A logic 1 in each single bit of the transmission data status registers 26 (TDSR0:TDSR3) signals that a write operation to the associated transmission data register 48 has occurred. The bits are defined as (STD0:STD63), which means status of transmission data 0 to 63. (e.g., bit STD5 represents the data status of TD5). Bits STD0:STD63 can only be cleared by writing a 1 to the bit location by the engine control unit 14. Writes of logic 0 by the engine control unit 16 to status bits (STD0:STD63) have no effect. The bits STD0:STD63 in registers 26 (TDSR0:TDSR3), if represented by a 1 indicate a write operation has occurred to the associated transmission data register by the transmission control unit 16 since the status bit was last cleared, and a 0 indicates that no write to the associated transmission data register has occurred since the status bit was last cleared.

The engine data status registers 30 (EDSR0:EDSR3) are 4 16-bit engine data status registers. These registers 30 are readable by engine control unit 14 and transmission control unit 16 and only writes of a logic 1 by the transmission control unit 16 have an effect on the registers. Bits SED0:SED63 in the engine data status registers 30 (EDSR0:EDSR3) are set by occurrence of write operations to the engine data registers 46 (ED0:ED63) respectively from the engine control unit 14. A logic 1 in each single bit of the engine data status registers 30 (EDSR0:EDSR3) signals that a write operation to the associated engine data register 46 has occurred. The bits are defined as SED0:SED63 which means status of ED0 to ED63. (e.g., the bit SED5 represents the data status of ENGINE DATA REGISTER 5 (ED5)). The bits SED0:SED63 can only be cleared by writing a one to the bit location by the transmission control unit 16. Writes of a logic 0 by the transmission control unit 16 to the status bits SED0:SED63 have no effect. The status bits SED0:SED63 in the engine data status registers 30 (EDSR0:EDSR3) is set at 1 if a write operation has occurred to the associated engine data register 46 (ED0:ED63) by the engine control unit 14 since the status bit was last cleared. A zero (0) in status bits SED0:SED63 indicates that no write to the associated engine data register 46 has occurred since last cleared.

The transmission status register 28 (TSR) is a 16 bit register containing the status of the transmission control unit 16. The transmission status register 28 is read/writable by the engine control unit 14 and read-only by the transmission control unit 16. The transmission data interrupt enable registers 18 (TDIER0:TDIER3) are 4 16-bit transmission interrupt enable control registers. These registers 18 are readable/writable by the engine control unit 14 and read-only by the transmission control unit 16. The engine data interrupt enable registers 22 (EDIER0:EDIER3) are 4 16 bit engine interrupt enable control registers. These registers 22 are readable/writable by the transmission control unit 16 and read-only by the engine control unit 14. The transmission control register 20 (TCR) is a 16 bit transmission control register. The transmission control register 20 is readable/writable by the engine control unit 14 and read-only by the transmission control unit 16.

The engine status register 32 (ESR) is a 16 bit register containing the status from the engine control unit 14. The engine status register 32 is read/writable by the transmission control unit 16 and read-only by the engine control unit 14.

The engine control register 24 (ECR) is a 16 bit engine control register. The engine control register 24 is readable/writable by the transmission control unit 16 and read-only by the engine control unit 14.

The control logic state machine 50 in the dual port ram 10 looks for write commands from either side of the dual port ram 12A, 12B into the appropriate ram registers. The state machine 50 will then set the appropriate write flag indicator in a status register when a valid write into a dual port ram register occurs. Both controllers 14, 16 have access to the write flag indicators to check whether they are set or clear. A number of protocols could be used between the controllers 14, 16 for setting and clearing the flags. As discussed above, FIG. 2 reveals how the flags are to be visible to both microprocessors 14, 16. There are two sides to the dual port ram 10: the local transmission control unit side and an "engine control unit side". Each side has its own read/writable space where it places data to be sent and each has its own readable space where each is supposed to read out received data.

The present invention employs a custom address/data parallel bus structure which communicates between the two microprocessor-based system on chip (SOC) digital cores 14, 16 (i.e., the engine and transmission controllers) to provide a fast operating parallel address and data bus 60 with a low overall cost. Because the bus 60 is only active when required, electromagnetic interference is minimized. The dual port RAM 12A, 12B, described above, is resident on the silicon of one of the two microprocessor cores 16. While the core 14 accesses the RAM 12 through the new external custom bus 60 of the present invention. The other core 16 has a standard on-chip address and data bus.

In order to minimize the number of pins or connections required for the engine control unit 14, the present invention utilizes a method of multiplexing the pins to reduce the required number of pins. (The addition of pins on the side of a piece of silicon translates directly into cost, since the silicon die size may need to increase in order to accommodate the extra pins required for the custom bus.)

Figure 3:
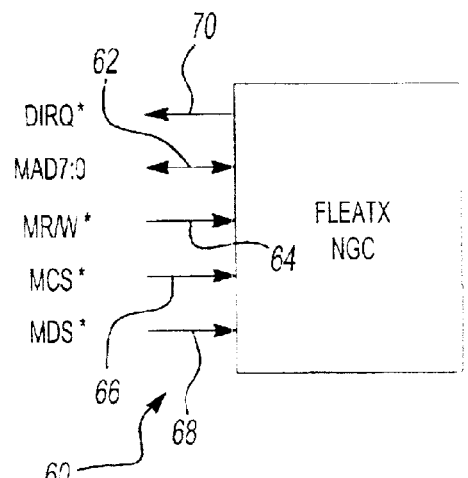
FIG. 3 is a schematic diagram showing the pinout architecture of the address/data bus architecture of the present invention.

With continued reference to FIG. 1, and in particular as detailed in FIG. 2, the custom bus of the present invention only requires eleven pins to fully implement 256 locations of word-wide data transfer. For the eight pins 62 in FIG. 3 referenced MAD7:MAD0, each pin 62 is used for three items: address, data-high-byte, and data-low-byte. These eight multiplexed address and data pins 62 are provided for de-coding the 256 word-wide (16-bit) locations. Multiplexed with the eight address bit lines are the 16-bit data lines which themselves are multiplexed since only eight pins are used to realize the address and data portions of this bus 60. The bus 60 supports bi-directional transfer of data dependent on the state of the read/write (MR/W) line 64 during the transfer. MR/W 64 is the read/write control signal from the engine controller 14. This signal is invalid unless MCS is active. The bus requires strobe lines MCS 66 and MDS 68 from the bus master to ensure data coherency. The MCS 66 is the chip select input from the external bus master device. This normally high signal transitions to a low level (active low) from the external device which must remain low for the duration of a multiplexed address and data bus cycle. It must also transition to the inactive state at the conclusion of the bus cycle.

The MDS 68 is the combined strobe for both address and data. The MDS 68 is also normally high when inactive and transitions to low (active low) for its strobing operation. The MDS line 68 will strobe low three times for each multiplexed address and data (MAD) bus cycle while MCS is low. It should be specifically noted that for a MAD bus cycle that if MCS transitions low then high with any number of MDS strobes other than three, the MAD bus cycle will be ignored by the non-bus master. In this case, no input will be generated by the non-bus master for a write cycle, or for a read cycle the MAD 7:0 lines will not deliver proper information on the MAD 7:0 lines. An interrupt request capability (DIRQ) is included in the bus architecture via line 70.

The multiplexed address and data bus 60 has only one bus master which is resident on the engine control unit 14. In the present invention, microprocessors 14, 16 are bus masters of one of the two ports going into the dual port ram 12 wherein one of the ports is totally internal to the system on chip that contained the dual port ram 12, and the other port is the external multiplexed address and data bus to the other microprocessor 14. With the custom bus 60 of the present invention, fully static, asynchronous transfer capability is provided so that communication between controllers of different bus speeds (within a range) and totally separate clock sources can be accomplished.

When no bus transfer is in progress the specialized address and data lines (MAD7:0) 62 are preferably kept at a logic low level. The two strobe lines MCS 66, MDS 68 are kept at a logic level high. The data direction select (MR/W) line 64 is preferably kept at a logic high. This type of operation reduces EMI radio frequency emissions.

Figure 4:
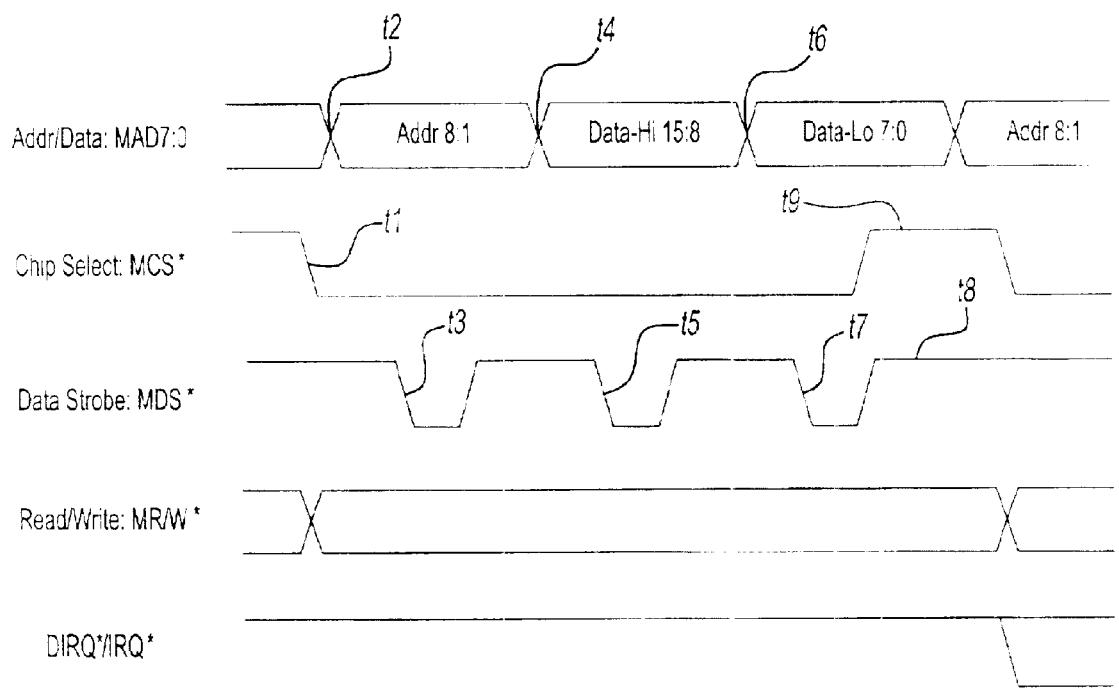
FIG. 4 is a timing diagram of the address/data bus architecture in accordance with the teachings of the present invention.

Turning now to FIG. 4, the timing diagram for the address/data bus is described in more detail. When a bus transfer is required, the bus master from the engine controller 14 shall perform the following procedure. First, the bus master initially sets the chip select strobe (MCS) line 66 low, as indicated at t1 and the state of the read/write line (MR/W) 64 is set to the proper level dependent on the direction of the data transfer required (either a read or a write). Second, the bus master preferably sets the state of the desired address on the (MAD7:0) lines 62 at t2. Next, after the address value has settled on the bus, the bus master shall strobe the data strobe line (MDS) 68 down once for a short duration as indicated at t3. The first strobe tells the non-bus master to latch in the states of the MAD7:0 lines 62 as the address value for this bus cycle. Also the state of the M R/W line 64 is latched to tell the non-bus master to either: expect more data input from the MAD7:0 lines 62 for a write bus cycle, or get data ready to be transferred out on the MAD7:0 lines for a read cycle.

The bus cycle continues in two different ways depending on the data transfer direction. For a write operation from the bus master the bus cycle is performed as follows. The multiplexed information lines (MAD7:0) 62 are set by the bus master to contain the data high byte that is to be stored at the location specified by the first data strobe as indicated at t4. The MDS line 68 is strobed low for a short duration (as indicated at t5) to inform the non-bus master to latch the value at MAD7:0 as the data high byte value. The multiplexed information lines (MAD7:0) are set by the bus master to contain the data low byte that is to be stored at the location specified by the first data strobe (as indicated at t6). The MDS line is then strobed low for a short duration (as indicated at t7) to inform the non-bus master to latch the value at MAD7:0 as the data low byte value. The received 16 bit data is written into dual port RAM location at t7.

For a read operation from the bus master, the bus cycle is performed as follows. First, the non-bus master must fetch the data to be sent back to the bus master. Next, the multiplexed information lines (MAD7:0) 62 are set by the non-bus master to the data high byte that was fetched from the location specified by the first data strobe. A specific requirement for the speed at which this fetch occurs by the non-bus master is needed because the non-bus master must fetch the data and place this data out onto the data bus for the bus master to access. The bus master is in control of the read operation. It will be guaranteed that the bus master will not access the data for a specific time so that the non-bus master has time to fetch its data. Next, the MDS data strobe line 68 is strobed low (at t5) by the bus master for a short duration to inform the non-bus master that the bus master has latched the value at MAD7:0 as the data high byte value. The bus master shall latch the data received from the non-bus master on the multiplexed information lines (MAD7:0) 62 as the data high byte value from the non-bus master during the strobe. The end of the second strobe signal indicated to the non-bus master that it can change the data value on the multiplexed information lines (MAD7:0) 62. At this point, the multiplexed information lines (MAD7:0) 62 are set by the non-bus master to contain the data low byte that was obtained from the location specified by the first data strobe signal (at t6). The non-bus master must change the value to the low byte data within a certain amount of time because the bus master initiates the final strobe signal.

The MDS data strobe line 68 is strobed low (at t7) by the bus master for a short duration to inform the non-bus master that it has latched the value at MAD7:0 as the data low byte value. This informs the non-bus master that this bus cycle is complete and it should stop driving the multiplexed information lines (MAD7:0) 62 immediately, since a new bus cycle may commence soon.

The bus cycle completes by the bus master negating the MDS line 68 by taking it to a logic level high (as indicated at t8), then negating the chip select line (MCS) 66 by forcing it to a logic high level (as indicated at t9), then driving the multiplexed information lines (MAD7:0) 62 to a low logic level for minimizing EMI concerns. The bus is now ready for its next bus cycle.

The custom bus also contains some logic to minimize improper bus cycles from corrupting data. The non-bus master unit counts the number of data strobes during a bus cycle for the proper count. If the unit's state machine does not count exactly three data strobes during the transfer (which is defined as one cycle of chip select low), then the cycle is flagged as invalid, and the data transfer is ignored.

The foregoing discussion discloses and describes exemplary embodiments of the present invention. One skilled in the art will readily recognize from such discussion, and from the accompanying drawings and claims, that various changes, modifications, and variations can be made therein without departing from the spirit and scope of the invention as defined in the following claims.

What is claimed is:

1. A multiplexed address and data bus controlled by a bus master for communication between two microprocessors, comprising:

a plurality of multiplexed address and data lines in communication between the two microprocessors;

a read/write control signal line in communication between the two microprocessors for communicating whether a read or a write operation is to be performed;

a chip select line in communication between the two microprocessor, said chip select line transitioning to an enable condition during a data transfer cycle; and a data strobe line in communication between the two microprocessors, said data strobe line providing a strobe each time a valid address and again each time valid data appears on said plurality of multiplexed address and data lines wherein said strobe occurring during said time said valid address appears on said multiplexed address and data lines initiates one of a write and read sequence.

2. A method of multiplexed address and data transfer for communicating between two microprocessors, comprising the steps of:

providing a chip select strobe signal to initiate a data transfer cycle and maintaining said chip select strobe signal during a duration of said data transfer cycle;

providing a read write line qualifier signal to identify whether a read or a write data transfer operation is to be preformed; and providing a data strobe signal that steps one of the microprocessors through the data transfer cycle wherein address information is transferred during a first data strobe of said data strobe signal and at least one data string is transferred during subsequent data strobes of said data strobe signal.

* * * * *